Sept. 9, 1952 J. P. ROGERS 2,609,702
TRANSMISSION
Filed July 18, 1950 2 SHEETS—SHEET 1
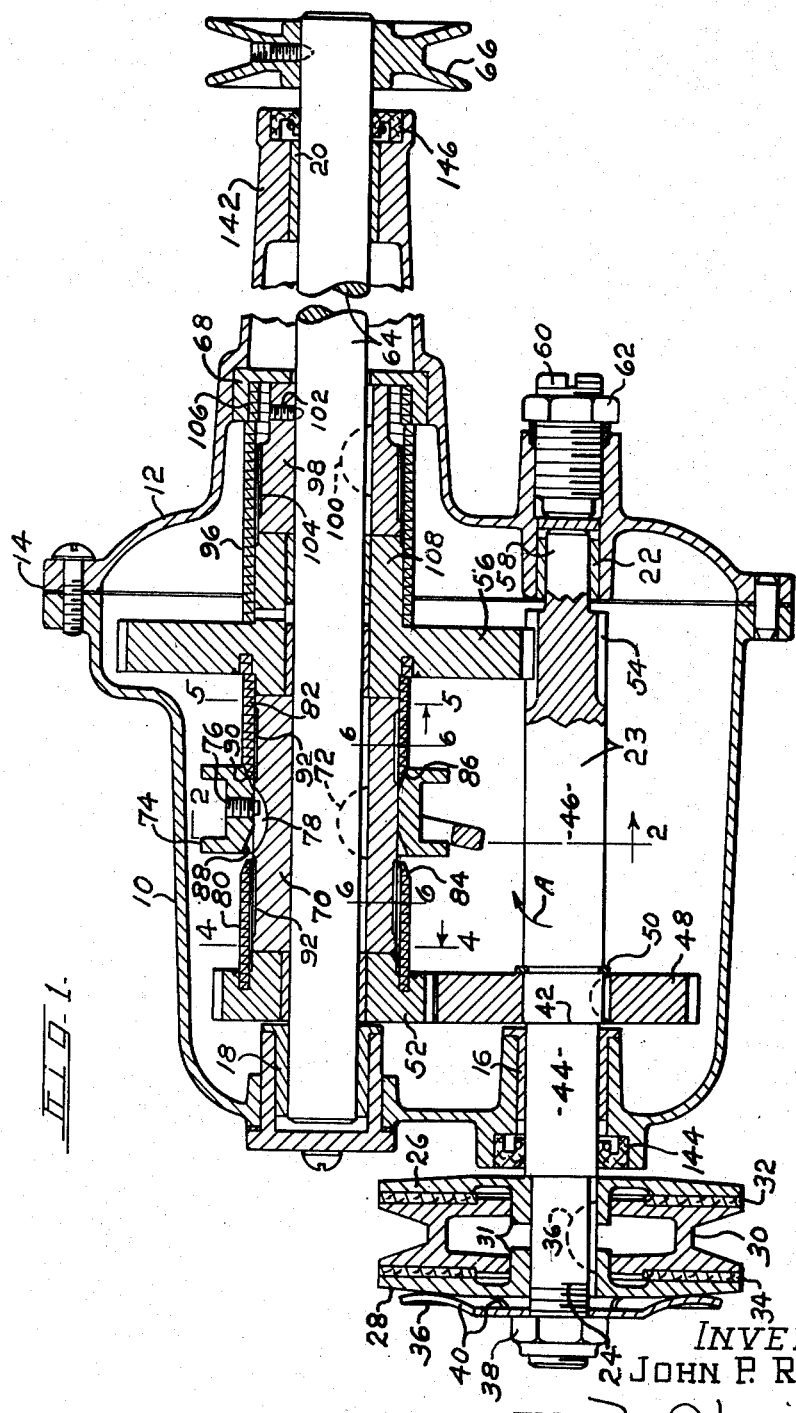
INVENTOR
JOHN P. ROGERS
BY
ATTORNEY Sept. 9, 1952           J. P. ROGERS           2,609,702
TRANSMISSION
Filed July 18, 1950                     2 SHEETS—SHEET 2
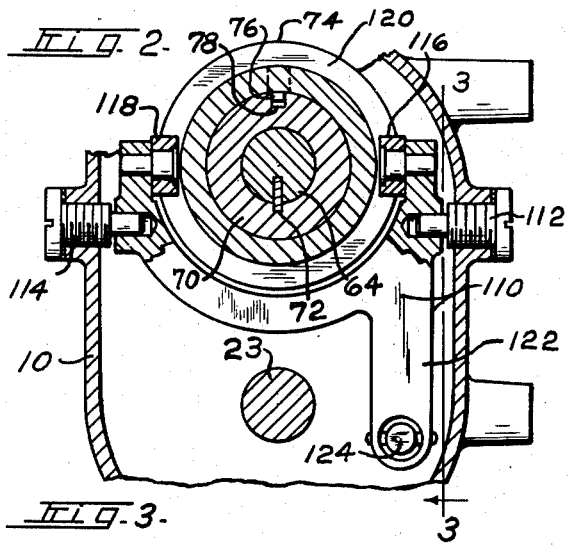
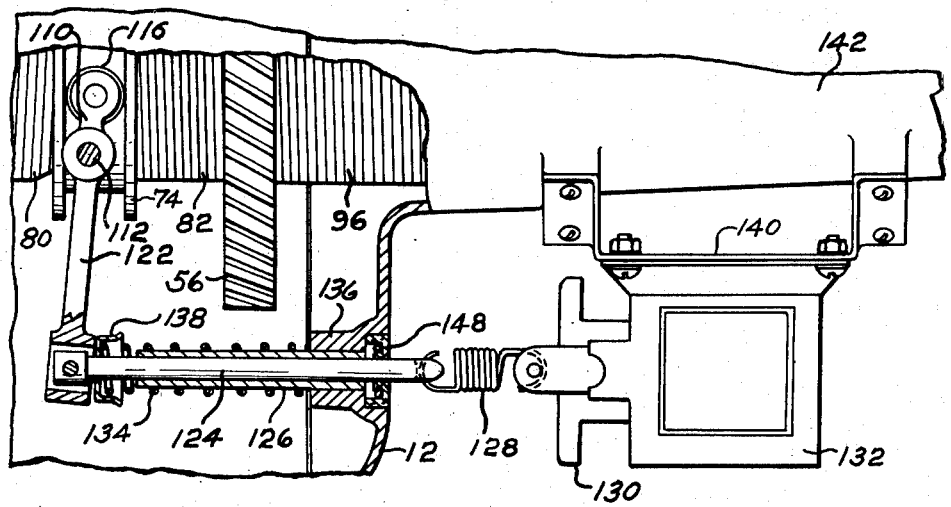
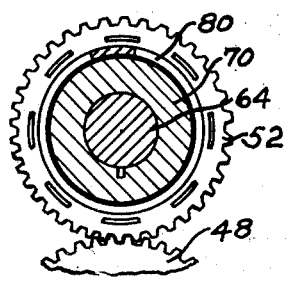 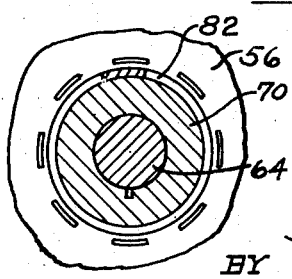 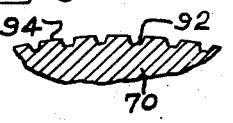
INVENTOR
JOHN P. ROGERS
BY
ATTORNEY Patented Sept. 9, 1952

2,609,702

UNITED STATES PATENT OFFICE 2,609,702

TRANSMISSION

John P. Rogers, Liverpool, N. Y., assignor to Easy Washing Machine Corporation, Syracuse, N. Y., a corporation of Delaware Application July 18, 1950, Serial No. 174,536

8 Claims. (Cl. 74—368)

This invention relates to variable speed transmissions, and more particularly to a transmission for providing two speeds in one direction and one speed in the opposite direction, and in which speed changes are controlled by a single operation and the direction of drive of the input shaft.

In application Serial No. 43,509, filed August 10, 1948, there is disclosed a transmission in which the driving shaft may be rotated in either direction and in which the output shaft may at will provide two different speeds in one direction of rotation and a single speed in the opposite direction. The present invention is directed to an improvement over the transmission therein disclosed, and in which there is utilized overrunning clutches of the so-called L. G. S. spring type. The transmission is so designed as to permit, through a single operation, a shift from low to high speed, and there is also provided a friction slip clutch to absorb any shock resulting from the actuation of the change speed mechanism.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a longitudinal section taken through the transmission;

Figure 2 is a transverse section taken substantially on the line 2—2 of Figure 1;

Figure 3 is a longitudinal section of one end of the transmission taken substantially on the line 3—3 of Figure 2;

Figure 4 is a transverse section through the driven shaft taken on the line 4—4 of Figure 1;

Figure 5 is a transverse section through the driven shaft taken substantially on the line 5—5 of Figure 1; and Figure 6 is an enlarged fragmentary section taken through either line 6—6 of Figure 1, to illustrate the nature of the friction surface engaged by the self-wrapping L. G. S. springs.

Referring to Figure 1, there is shown a casing composed of opposite end portions 10 and 12 bolted together by flanges as at 14. The end portions are provided with spaced journals 16 and 18 for the driving and driven shafts at one end, and 20 and 22 for the driving and driven shafts at the other end. The driving shaft 23 is provided with a reduced diameter portion 24 upon which are mounted spaced friction face plates 26 and 28, there being positioned a drive sheave 30 between the friction facings 32 and 34. The drive sheave 30 is journaled on the hubs 31 of the face plates 26 and 28. Such plates 26 and 28 are keyed as at 36 to the drive shaft 23 and are held in frictional engagement with the drive sheave by a resilient dished spring washer 36 held upon the reduced end portion 24 of the shaft 23 by a nut 38. Such spring washer may be radially slitted as at 40 to provide an even pressure against the disk 28 over its entire circumference. The shaft 23 may be stepped as at 42 between the bearing portion 44 and an enlarged portion 46 forming the main body. Keyed to the main body 46 is a drive gear 48 suitably positioned by a split ring 50. Such drive gear being of a relatively large diameter and meshing with the driven pinion 52, provides the high speed drive of the transmission.

The shaft body 46 at its right hand end has integral teeth 54 cut therein to provide a pinion of relatively small diameter. Such pinion as is thus provided meshes with a relatively large driven gear 56 to provide low speed operation. The shaft 46 has a reduced diameter bearing portion 58 received in the journal 22, and an axially positioned adjustable stud 60 with lock nut 62 is inserted in the end of the bearing in order to provide for and regulate end play of the shaft 23, and also to receive the thrust thereof provided it be desired to use spirally cut teeth upon the various gear trains.

The driven shaft 64 carries at its right hand end an output drive pulley 66 and between the bearing 18 and an annular shoulder member 68 located in the casing member 12 there is positioned an assemblage of parts including the driven gears 52 and 56, which gears are freely rotatable upon the shaft 64. Located between the gears 52 and 56 is a sleeve 70 keyed to the shaft 64 as at 72. Such sleeve has positioned centrally thereon a tickler collar 74 which is shiftable axially of the sleeve but which is also provided with a set screw 76 inwardly projecting into a longitudinal groove or keyway 78 whereby such collar rotates with the sleeve. Each of the gears 52 and 56 is provided with rectangular section coil springs of the wrap-around over-running type known as L. G. S. springs, the spring 80 having its end rooted in the gear 52 and the spring 82 having its end rooted in the gear 56. The free ends of the springs 80 and 82 are slightly tapered as at 84 and 86, and the normal internal diameter of such spring when unstressed is slightly larger than the external diameter of the sleeve 70. The tickler collar 74 is provided with internal oppositely facing tapers 88 and 90 which are adapted to engage the respective tapered ends 84 and 86 of the coil springs 80 and 82. The direction of wrap of the springs 80 and 82 are opposite as indicated in Figure 3.

Assuming the drive shaft to be rotating in the direction of arrow A, rotation of the driven shaft in the opposite direction at high speed may be effected by shifting the tickler collar 74 to the left whereby to engage the tapered surface 88 with the tapered end 84 of the spring 80. The spring 80 is helical in such direction as to cause the spiral turns of the spring 80 upon frictionally engaging the collar 74, to wrap tightly around the sleeve 70, causing the gear 52 to thereby drive the shaft 64 through the resultant frictional connection between the inner surface of the free turns of the coil spring 80 which have thus been reduced in diameter by the light frictional contact between the tapered end turns 84 and the internal tapered surface 88 of the tickler collar 74.

It will be observed that the sleeve 70 is provided with a plurality of longitudinally extending grooves 92 breaking up its otherwise cylindrical surface 94 to provide additional frictional gripping effect between the sleeve 70 and the spring 80, and to assure release of such grip when frictional contact between the collar and spring end is broken. High speed drive having once been established in the manner set forth, it will appear that such drive may be immediately broken by shifting the tickler collar 74 to the right, permitting the turns of the friction spring to expand and lose their grip upon the sleeve 70.

If a low speed drive in the same direction be desired, the tickler collar 74 is shifted to the right to the position shown, in which it will appear that by reason of the opposite direction of the helical turns of the coil spring 82, such turns will be caused to contract about the sleeve 70 as shown, and to thereby provide frictional drive at low speed. If low speed drive is desired during rotation of the drive shaft in the opposite direction, such drive may be effected by the coil spring 96 shown to the right of the gear 56. Such coil spring is wound in the direction indicated in Figure 3. More in detail, the shaft 64 is provided with a low speed drive sleeve 98 keyed as at 100 to shaft 64 and secured against endwise movement by a set screw 102. Such sleeve has an external longitudinally grooved surface 104, as previously described in connection with sleeve 70, and the annular flanged member 68 is provided with a cylindrical internal smooth friction surface 106 in which is inserted under slight stress the end of the helical drive spring 96. When the gear 56 is rotated by the driving shaft turning in the direction opposite to arrow A, the friction fit between the coil spring 96 and the cylindrically surfaced hub 108 of the gear 56 will cause such spring to turn with the gear 56 and frictionally drag at its opposite end upon the internal surface 106 of the annular flanged member 68. The frictional drag at the right hand end thus caused results in stressing the intermediate portion of the helical spring so as to contract the same and cause it to grip upon the external longitudinally grooved surface 104 of the sleeve 98. Thus drive is effected from the gear 56 to the sleeve 98, the latter being keyed to the shaft 64.

Interference between the low speed drive just previously described and the high or low speed drive derived by engagement of either spring 80 or 82 will be seen to be eliminated by the fact that when the gear 52 is driving the sleeve 70 through frictional grip of the coil spring 80, the shaft 64 will be traveling at a speed greater than the gear 56. The result will be that the sleeve 98, moving at a faster rate than is frictionally enforced upon the coil spring 96, will cause such coil spring 96 to expand and loosen its grip upon the longitudinally grooved surface 104 as well as its grip upon the collar 108 of the gear 56, which gear will be moving at a lower speed than shaft speed. Thus, the clutch provided by the coil spring 96 is caused to overrun by the differential of speed between the shaft 64 and the gear 56. When low speed drive is effected through gear 56 and spring 82, such gear rotates in a direction to expand the diameter of spring 96, again maintaining complete release from the sleeve 98.

It will be seen from the structure thus described that the output speed of the transmission may be easily varied by the simple expedient of shifting the tickler collar 74 from one end position to the other and by rotating the drive shaft in one direction or the other. As is shown in more detail in Figures 2 and 3, the tickler collar 74 may be shifted by a yoke 110 mounted on pivots 112 and 114, the yoke having rollers 116 and 118 riding in the annular groove 120 of the collar 74. The yoke is provided with a lever arm 122 to which is connected a link 124 sliding in a sleeve 126 mounted in the end wall 12 of the transmission, such link emerging outside of the transmission housing and being coupled through a spring 128 to an armature 130 of a solenoid 132. The coil spring 134 may be mounted around the sleeve 126 and bear against at one end the boss 136 in the end member 12 and at the other end against the end of the lever 122 through a centering cup 138. The solenoid 132 may be mounted upon a suitable bracket 140 on the bearing extension 142 of the housing 12.

The shaft bearings are provided with seals such as 144 and 146, wherever desired, so that the transmission may be filled with and retain an adequate supply of oil at all times. For the same purpose, the link 124, where it emerges from the casing 12, may be provided with a seal 148.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What I claim is:

1. In combination with a constant mesh, plural ratio transmission, gearing, having high and low speed driven gears and separate selectively operable overrunning clutch means associated with each driven gear arranged to couple the same to a common output shaft concentric therewith for driving the output shaft in one direction at either one of two different speeds, means for normally biasing said selectively operable overrunning clutch means for engagement of the low speed driven gear with the shaft, and control means for overcoming said biasing means for engagement of the high speed driven gear with the shaft.

2. In combination with a constant mesh, plural ratio transmission, gearing, having high and low speed driven gears and separate selectively operable overrunning clutch means associated with each driven gear arranged to couple the same to a common output shaft concentric therewith for driving the output shaft in one direction at either one of two different speeds, means for normally biasing said selectively operable overrunning clutch means for engagement of the low speed driven gear with the shaft, and electromagnetic control means for overcoming said biasing means for engagement of the high speed driven gear with the shaft.

3. In a transmission, a drive shaft, a driven shaft, high and low speed gear trains including high and low speed driven gears for driving said driven shaft from said drive shaft, sleeve means keyed for rotation with said driven shaft located intermediate said driven gears, a self-wrapping helical clutch spring secured to each of said driven gears and having their respective free ends extending in telescopic relation to said sleeve means, means associated with said sleeve means and located centrally thereof and rotatable therewith and axially movable with respect to said helical springs, said associated means being adapted to engage the free end of either of said springs to torsionally stress one or the other of said springs into engagement with said sleeve means upon relative rotation, means for biasing said associated means to engage the spring secured to the low speed gear of said low speed gear train, and means for overcoming said biasing means for engagement of said associated means with the other of said springs.

4. In a transmission, a drive shaft, a driven shaft, high and low speed gear trains including high and low speed driven gears for driving said driven shaft from said drive shaft at two different speeds in the same direction, sleeve means keyed for rotation with said driven shaft located intermediate said driven gears, sleeves carried by said driven gears adjacent said sleeve means, a self-energizing selectively operable helical clutch spring associated with each of said sleeves and sleeve means and disposed in telescopic relation thereto, each of said helical springs being operable to drive said driven shaft in the same direction from one or the other of said driven gears, means carried by said driven shaft and axially shiftable from one position to another for selectively rendering one or the other of said helical springs operable to drive said driven shaft from the respective driven gear, means for biasing said shiftable means to the low speed position, and control means for overcoming said bias and shifting said shiftable means to the high speed position.

5. In a transmission, a drive shaft, a driven shaft, high and low speed gear trains including high and low speed driven gears for driving said driven shaft from said drive shaft at two different speeds in the same direction, sleeve means keyed for rotation with said driven shaft located intermediate said driven gears, sleeves carried by said driven gears adjacent said sleeve means, a self-energizing selectively operable helical clutch spring associated with each of said sleeves and sleeve means and disposed in telescopic relation thereto, each of said helical springs being operable to drive said driven shaft in the same direction from one or the other of said driven gears, means carried by said driven shaft and axially shiftable from one position to another for selectively rendering one or the other of said helical springs operable to drive said driven shaft from the respective driven gear, means for biasing said shiftable means to the low speed position, and electromagnetic control means for overcoming said bias and shifting said shiftable means to the high speed position.

6. In a transmission, a driven shaft, driving gears mounted thereon and freely rotatable with respect to said shaft, means for continuously driving said gears in the same direction, one faster than the other, helical clutch springs secured to each of said gears arranged concentrically around said shaft and extending toward one another, a clutch collar slidably mounted on said shaft, and keyed for rotation therewith and adapted to selectively frictionally engage either one spring or the other to stress said springs to vary their diameter, upon relative rotation between the engaged spring and collar, and cylindrical gripping surfaces adapted for rotation with said driven shaft telescopically arranged with respect to each of said springs, said collar being adapted upon engagement with one or the other of said springs and relative rotation to vary the diameter of one or the other of said springs to cause engagement thereof with the respective cylindrical gripping surface, means for biasing said collar into engagement with the spring secured to the lower speed gear, and means for overcoming said biasing means for engagement of said collar with the other of said springs.

7. In a transmission, a driven shaft, driving gears mounted thereon and freely rotatable with respect to said shaft, means for continuously driving said gears in the same direction, one faster than the other, helical clutch springs secured to each of said gears arranged concentrically around said shaft and extending toward one another, a clutch collar slidably mounted on said shaft, and keyed for rotation therewith and adapted to selectively frictionally engage either one spring or the other to stress said springs to vary their diameter, upon relative rotation between the engaged spring and collar, and cylindrical gripping surfaces adapted for rotation with said driven shaft telescopically arranged with respect to each of said springs, said collar being adapted upon engagement with one or the other of said springs and relative rotation to vary the diameter of one or the other of said springs to cause engagement thereof with the respective cylindrical gripping surface, means for biasing said collar into engagement with the spring secured to the lower speed gear, and electromagnetic control means for overcoming said biasing means for engagement of said collar with the other of said springs.

8. In a transmission, a driven shaft, a low and high speed gear train having low and high speed driven gears rotating in the same direction at different speeds and rotatably mounted on said shaft, a normally inactive overrunning clutch for each of said gears adapted to couple one or the other of said gears to the driven shaft upon rotation of said gears in said same direction, means rotatable with the driven shaft and adapted for axial movement from one position to another position to render one or the other of said clutches active to clutch the shaft upon relative rotation between said driven gears and said driven shaft, and means for continuously biasing said rotatable means for axial movement to a position to render active the overrunning clutch associated with said slow speed gear, and electromagnetic control means for overcoming said biasing means to render active the overrunning clutch associated with the high speed gear.

JOHN P. ROGERS.

REFERENCES CITED

The following references are of record in the file of this patent:

UNITED STATES PATENTS

| Number | Name | Date |
|---|---|---|
| 1,843,523 | Starkey et al. | Feb. 2, 1932 |
| 1,940,880 | Pitter | Dec. 26, 1933 |
| 2,052,961 | Bonham | Sept. 1, 1936 |
| 2,185,731 | Hubbell | Jan. 2, 1940 |
| 2,191,609 | Dodge | Feb. 27, 1940 |
| 2,191,629 | Scott | Feb. 27, 1940 |
| 2,456,600 | Trout | Dec. 14, 1948 |
| 2,456,734 | Ritzert | Dec. 21, 1948 |
| 2,517,887 | Korn | Aug. 8, 1950 |